United States Patent [19]

Pong et al.

[11] Patent Number: 5,390,947
[45] Date of Patent: Feb. 21, 1995

[54] BICYCLE WHEEL MOUNT

[75] Inventors: Alex Pong, Langley; Skooks Pong, Freeland, both of Wash.

[73] Assignee: Cannondale Corporation, Georgetown, Conn.

[21] Appl. No.: 122,143

[22] Filed: Sep. 16, 1993

[51] Int. Cl.⁶ ............................................. B60B 37/00
[52] U.S. Cl. ........................... 280/286; 280/281.1; 280/285; 280/277; 188/26; 301/2.5
[58] Field of Search .......... 280/281.1, 285, 286, 280/288, 277, 260, 261, 274; 180/227, 230; 188/26; 301/1, 2.5

[56] References Cited

U.S. PATENT DOCUMENTS

| | | | |
|---|---|---|---|
| 3,847,440 | 11/1974 | Mattsson | 301/1 |
| 4,170,369 | 10/1979 | Strutman | 280/288 X |
| 4,553,622 | 11/1985 | De Cortanze | 280/286 X |
| 4,659,097 | 4/1987 | Kupper et al. | 280/288 X |
| 4,742,884 | 5/1988 | Ishikawa | 180/227 X |
| 4,809,802 | 3/1989 | Seino et al. | 180/227 X |
| 4,889,205 | 12/1989 | Yoshimi | 180/227 |

*Primary Examiner*—Kenneth R. Rice
*Assistant Examiner*—F. Zeender
*Attorney, Agent, or Firm*—Brumbaugh, Graves, Donohue & Raymond

[57] ABSTRACT

A bicycle comprises a wheel-supporting member having an annular sleeve portion, a stub wheel spindle having a journal portion supported for rotation in the sleeve portion by thin wall, large diameter angular contact bearings, a wheel attachment portion extending laterally out of the sleeve in cantilevered relation, and a wheel having a hub received on the wheel attachment portion of the spindle. The wheel attachment portion of the spindle and the wheel hub have mating tapered surfaces so as to provide precise alignment of the wheel and mating splines so as to couple the wheel to the spindle for rotation. The wheel is fastened to the spindle by a split tapered collet and a latch mechanism that holds the collet in place and is releasable by operation of a single member.

11 Claims, 4 Drawing Sheets

BICYCLE WHEEL MOUNT

BACKGROUND OF THE INVENTION

Bicycle wheels are conventionally mounted on axles that pass through a wheel hub and are attached at opposite ends, usually by clamping, to a pair of members that support the bicycle frame on the wheels and that straddle the wheels. The members to which the front wheels are attached are dropouts on the lower ends of the legs of the front fork, and the members to which the rear wheels are attached are rear dropouts at the ends of the chain stays. Commonly, the axles are connected to the dropouts by quick release skewers, which enable rapid release and reconnection of the axle to the dropouts. Nonetheless, removal and replacement of bicycle wheels, particularly the rear wheel, takes time. Often, the slow part of the process is getting the wheel aligned. Removal and replacement of the rear wheel includes the further complications and delays caused by having to detach the driven sprocket wheel, which comes off with the wheel, from the drive chain and derailleur and then replace the chain on the sprocket wheel.

SUMMARY OF THE INVENTION

One object of the present invention is to provide a bicycle wheel mount in which the wheel is attached in cantilevered relation on one side of a member so that it is removed and replaced from the side rather than vertically. Another object is to provide a bicycle wheel mount that aligns the wheel precisely at the time of installation without any manipulation. It is also an objective to provide a wheel mount that is very strong and rigid. And it is desired, preferably, to provide for removal and reinstallation of a bicycle wheel by operation of only a single member using a simple tool. Another object is, in the case of the rear wheel, to permit removal and replacement of the wheel without having to reattach and replace the chain on the driven sprocket wheel.

The foregoing objects are attained, in accordance with the present invention, by a bicycle comprising a wheel-mounting member having an annular sleeve portion, a stub wheel spindle having a journal portion received in the sleeve portion for rotation and a wheel attachment portion extending laterally out of the sleeve in cantilevered relation, a wheel having a hub received on the wheel attachment portion of the spindle, and one or more devices for detachably fastening the wheel to the spindle.

The mounting of the wheel in cantilevered relation to the member on which it is mounted imposes large torques on the bearings in directions perpendicular to the axis of rotation of the wheel, especially in the vertical, load-carrying direction. The use of special bearings enables the required loads to be carried strongly and rigidly in a narrow member. Suitable bearings include: pairs of axially spaced apart large diameter thin section angular contact ball bearings; a single large diameter thin section four point split inner race ball bearing.; and a single large diameter thin section crossed roller bearing.

In preferred embodiments of the invention, the wheel attachment portion of the spindle and the wheel hub have mating tapered surfaces so as to provide precise alignment of the wheel and mating splines so as to couple the wheel to the spindle for rotation.

Although conventional fastening systems may be used to attach the wheel hub to the spindle, such as bolts received in threaded holes in a flange on the spindle, it is advantageous to fasten the wheel to the spindle by a device or mechanism that is done and undone by operation of a single member. A preferred device for fastening the wheel to the spindle includes a split tapered collet received between tapered surfaces on the wheel hub and the wheel attachment portion of the spindle and a releasable latch mechanism for retaining the collet in seated relation on the tapered surfaces. An exemplary latch mechanism includes a multiplicity of circumferentially spaced apart latch members mounted on the spindle for movement such as by a push plate, into and out of engagement with the collet upon operation of a single member. The latch members may be pivotally mounted on the spindle and include first arms engageable with the collet and second arms coupled to the push plate. The single member can be a screw unto which the push plate is threaded. The push plate is movable axially of the screw and is non-rotatable relative to the spindle. The screw axially engages an abutment on the spindle, and the reaction force of the screw is applied to the abutment when the latch members engage the collet in seated relation on the tapered surfaces of the spindle and hub.

Optionally, in a bicycle having a wheel mount according to the invention, a brake disc may be attached to the journal portion of the spindle on an end thereof opposite from the wheel attachment portion, the brake disc being located laterally of the wheel-supporting member on the side thereof opposite from the wheel.

For a better understanding of the invention, reference may be made to the following description of an exemplary embodiment, taken in conjunction with the accompanying drawings.

DESCRIPTION OF THE EMBODIMENT

The bicycle shown in FIG. 1 incorporates several highly unique features, which include those described and shown in the following patent applications that are being filed concurrently with the present application and that are hereby incorporated by reference into the present specification:

Ser. No. 08/122,140, entitled "Monocoque Bicycle Wheel";

Ser. No. 08/122,142, entitled "Bicycle With Trailing Arm Wheel Suspensions";

Ser. No. 08/122,147, entitled "Bicycle Bottom Bracket/Crank Assembly";

Ser. No. 08/122,097, entitled "Bicycle Headset"; and

Ser. No. 08/122,098, entitled "Bicycle Frame."

Figure 1:
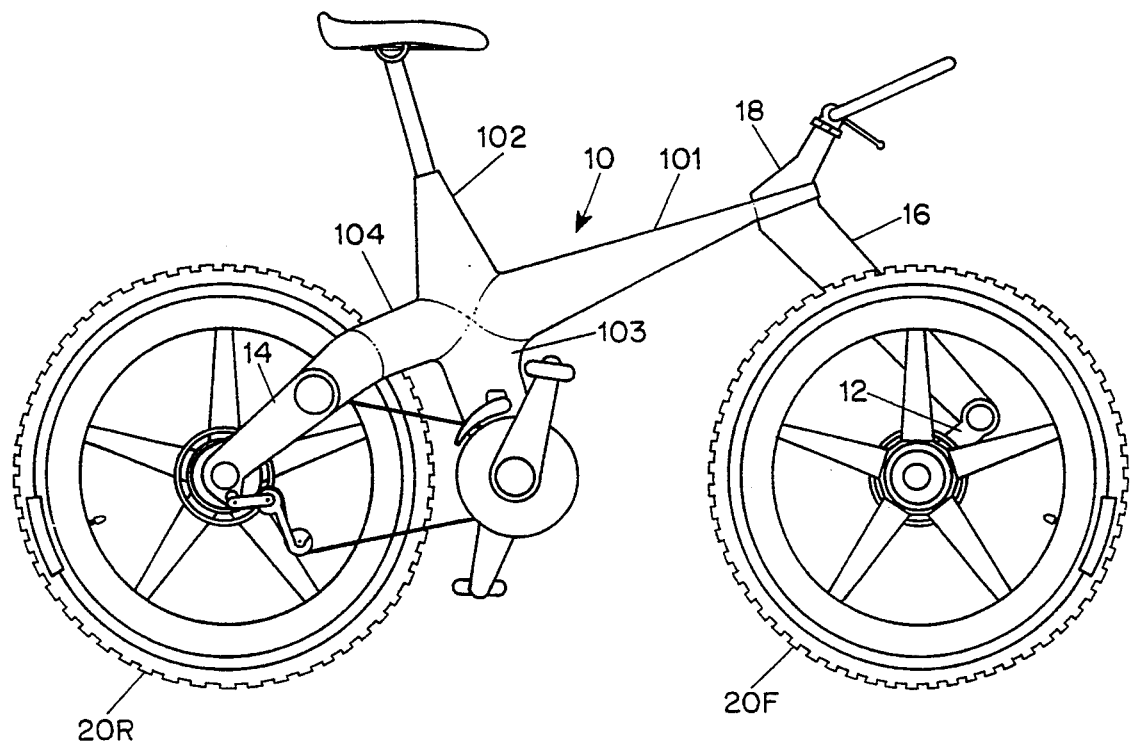
FIG. 1. is a side elevational view of a bicycle equipped with wheel mounts according to an embodiment of the invention.

Many of the structural components of the bicycle of FIG. 1 are of monocoque construction, including the frame 10, the swing arms 12 and 14 of the wheel suspensions, the front wheel support member 16, and the handlebar support arm 18, which is affixed to the support arm 16 and rotatably mounted in a collar at the front of the frame 10. The frame is generally "t"-shaped, the "t" being oriented sideways to present an inclined front leg portion 101, a seat support arm portion 102, a crank support arm portion 103 and a short, bent rear leg portion 104, to which the rear swing arm 14 is attached. Unlike conventional bicycles, in which the wheels are carried on axles extending between members that straddle the wheels (front fork legs and rear triangles), the front and rear wheels 20F and 20R, which are preferably but not necessarily of monocoque construction and are, preferably, identical, are, according to the present invention, mounted in cantilevered relation on one side of the respective swing arms 12 and 14, which permits them to be removed and replaced laterally rather than vertically. The wheel mount of the present invention also permits the wheels to be removed while leaving the bearings in place and in the case of the rear wheel allows the drive train to remain undisturbed. The monocoque form of the structural components and the wheels of the bicycle makes them strong and rigid but permits them to be of light weight. The wheel mount of the present invention can be used with bikes having conventional frames and other forms of wheels.

Another aspect of the construction of the bicycle is the use of thin wall, large diameter angular contact bearings in all pivot connections, including the steering collar, wheel journals, swing arms, and bottom pedal crank. Those bearings allow large moments to be applied and occupy a minimum of space, as compared with the multiple bearing sets within relatively long sleeves that are used in conventional headsets, bottom brackets and wheel journals. As used hereinafter, the term "thin wall, large diameter angular contact bearings" includes the following specific bearings: a pair of axially spaced apart large diameter thin section angular contact ball bearings; a single large diameter thin section four point split inner race ball bearing; and a single large diameter thin section crossed roller bearing.

In the bike of FIG. 1, the wheels are mounted in swing arms that are parts of an energy-absorbing, damped trailing arm suspension. The wheel mounts of the present invention can be used with bikes that have other forms of active suspensions or that do not have active suspensions. Accordingly, in FIG. 2, the member 30 on which the wheel is mounted may be any suitable wheel-mounting member of a bicycle. The member 30 shown is a monocoque, composed of lateral-half parts 301 and 302 joined at their edges. The member includes an annular sleeve portion 303 in which a journal portion 321 of a hollow stub spindle 32 is supported by a pair of axially spaced apart large diameter thin section angular contact ball bearings 34. A brake disc 36 located on one side of the wheel-mounting member 30 is attached to the journal portion 321 by screws 38. A wheel attachment portion 322 of the spindle extends laterally from the side of the member 30 opposite the brake disc 36. The hub portion 401 of a monocoque wheel 40, which is composed of lateral half parts 402 and 403 joined at mating edges, is received on the portion 322 of the spindle.

The wheel hub 401 is precisely seated on the spindle 34 for accurate alignment when installed by mating tapered surfaces 401a and 322a on the hub and spindle, respectively, and is coupled to the spindle for rotation by mating splines 401b and 322b. A split tapered collet 42, which engages tapered surfaces 401c and 322c on the hub and spindle, respectively, securely fastens the wheel hub to the spindle.

Figure 2:
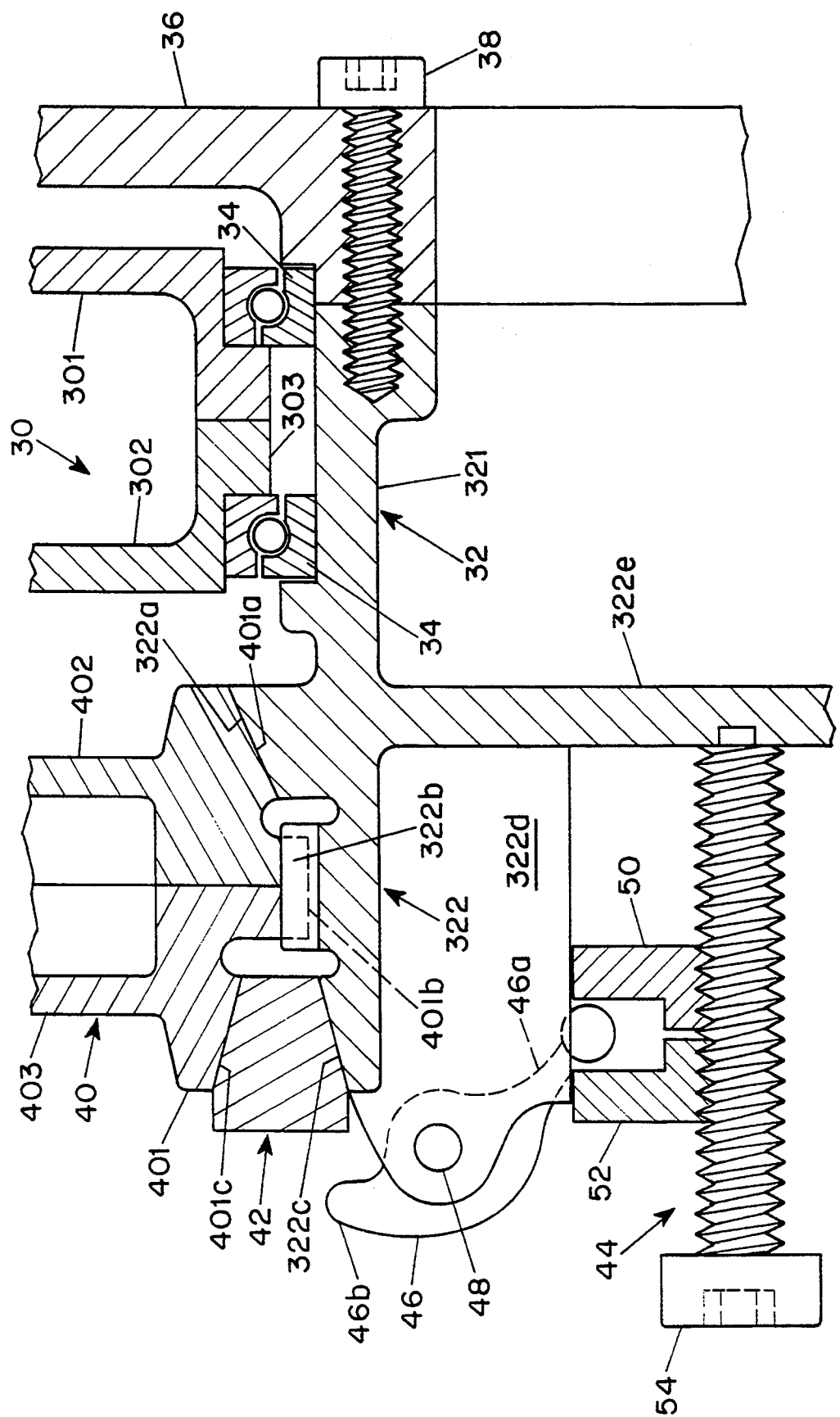
FIG. 2 is a half cross-sectional view of the wheel mount, showing the wheel in place on the spindle with the latch mechanism partly undone.
Figure 3:
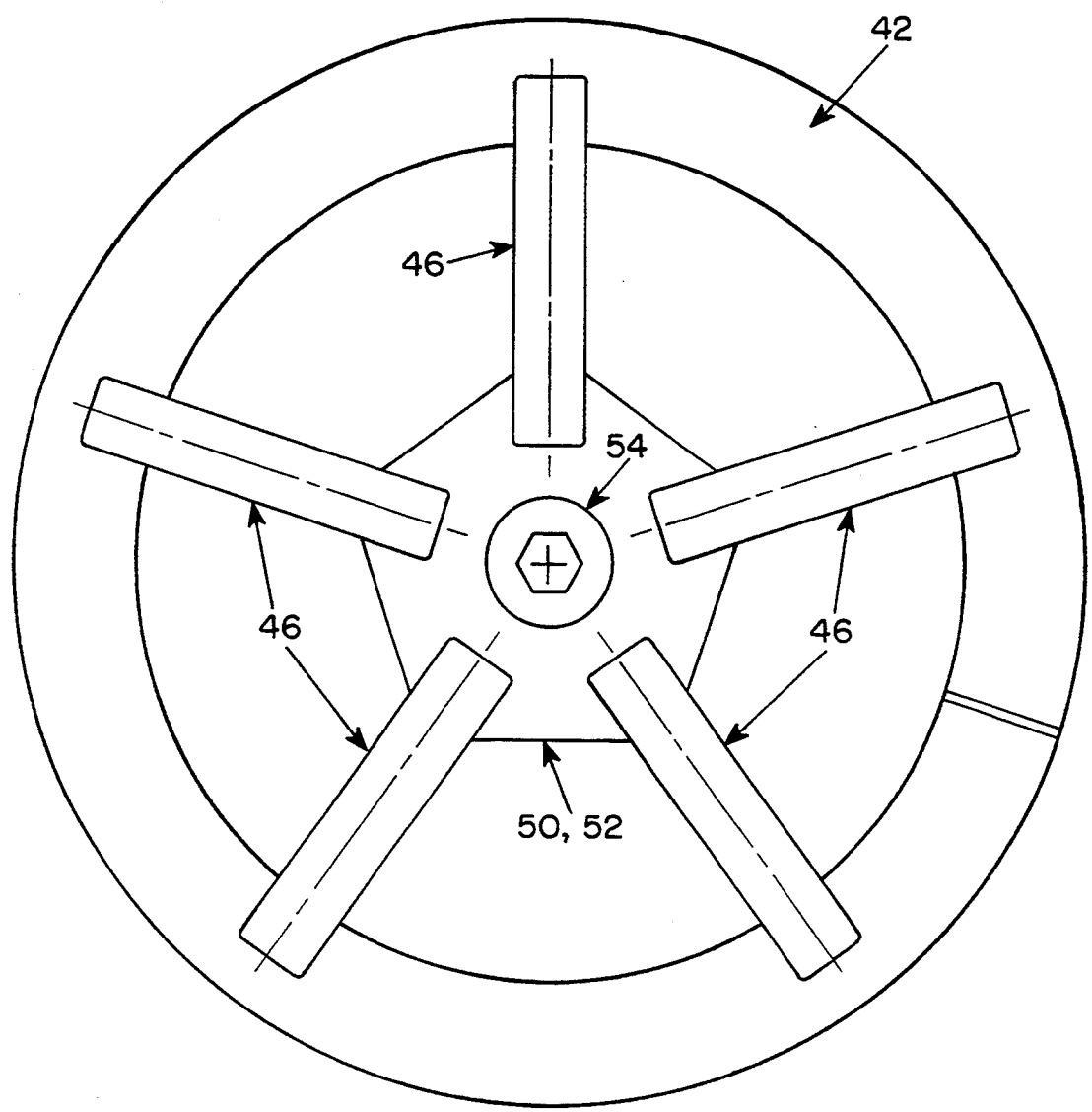
FIG. 3 is fragmentary side elevational view of the latch mechanism.
Figure 4:
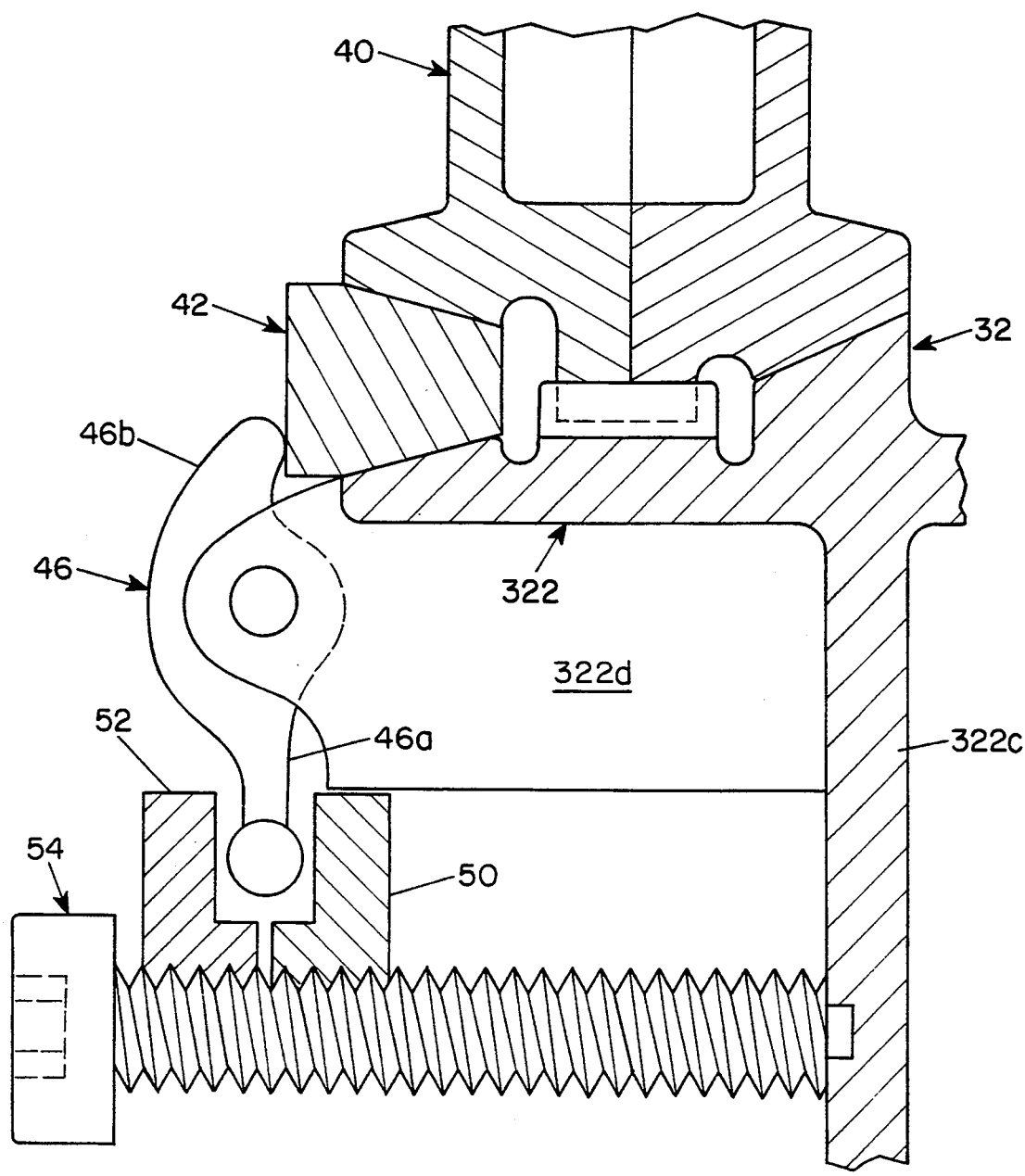
FIG. 4 is a partial half cross-sectional view of the wheel mount, showing the wheel in place on the spindle and the latch mechanism done up.

A latch mechanism 44 operated by a single member engages the collet 42 to maintain the hub fastened to the spindle. The latch mechanism includes equally circumferentially spaced-apart latch members 46, each of which is pivotally mounted by a pin 48 on a web portion 322d of the spindle. Push plates 50 and 52 are threaded onto an Allen head cap screw 54 that is received axially within the spindle and engages a transverse wall 322e at the base of the attachment portion 322. When the screw 54 is rotated in one direction, the push plates, which have facets at their perimeters in sliding fit with the webs 322d so that they cannot rotate with the screw, are threaded out away from the wall 322e. The push plate 50 nearer the wall 322e engages and pushes on the radially inner arm portion 46a of each latch member 46, thereby pivoting the latch members so that their outer arm portions 46b ultimately engage the collet 42 and hold it securely in place, as shown in FIG. 4. Rotating the screw 54 in the other direction moves the push plates toward the wall 322e, which releases the latch members 46 (FIG. 2).

We claim:

1. A bicycle comprising a wheel-mounting member having a narrow large diameter sleeve portion, a tubular stub wheel spindle having a journal portion received in the sleeve portion and mounted for rotation on a thin wall, large diameter angular contact bearing the spindle further having a tubular wheel attachment portion extending laterally out of the sleeve portion in cantilevered relation, a wheel having a hub received on the wheel attachment portion of the spindle, the wheel attachment portion of the spindle having a large diameter conical surface and the wheel hub having a large diameter conical surface mating directly with the conical surface of the wheel attachment portion of the spindle so as to provide precise alignment of the wheel, and means for detachably fastening the wheel to the spindle.

2. A bicycle according to claim 1 wherein the wheel attachment portion of the spindle and the wheel hub have mating splines so as to couple the wheel to the spindle for rotation.

3. A bicycle according to claim 1 wherein the means for fastening the wheel to the spindle is releasable by operation of a single member.

4. A bicycle according to claim 3 wherein the means for fastening the wheel to the spindle includes a split tapered collet received between a first tapered surface on the wheel hub and a second tapered surface on the wheel attachment portion of the spindle and releasable means for retaining the collet in seated relation on the tapered surfaces.

5. A bicycle according to claim 4 wherein the releasable means for retaining the collet in seated relation on the tapered surfaces includes a multiplicity of circumferentially spaced apart latch members mounted on the spindle for movement into and out of engagement with the collet upon operation of the single member.

6. A bicycle according to claim 5 wherein the releasable means for retaining the collet in seated relation on the tapered surfaces further includes a push plate engaging the latch members and movable upon operation of the single member.

7. A bicycle according to claim 6 wherein the latch members are pivotally mounted on the spindle and include first arms engageable with the collet and second arms coupled to the push plate, the single member is a screw, and the push plate is threaded onto the screw.

8. A bicycle according to claim 7 wherein the push plate is movable axially of the screw and is non-rotatable relative to the spindle, and wherein an end of the screw engages an abutment to which the reaction force of the screw is applied when the latch members engage the collet in seated relation on the tapered surfaces of the spindle and hub.

9. A bicycle according to claim 1 and further comprising a brake disc attached to the journal portion of the spindle on an end thereof opposite from the wheel attachment portion, the brake disc being located laterally of the wheel-supporting member on a side thereof opposite from the wheel.

10. A bicycle according to claim 2 wherein the conical surfaces of the spindle and wheel hub are separate from the mating splines.

11. A bicycle according to claim 1 and further comprising a disc member attached to the journal portion of the spindle on an end thereof opposite from the wheel attachment portion for rotation with the spindle, the member being located laterally of the wheel-mounting member on a side thereof opposite from the wheel.

* * * * *